Dec. 7, 1943.   O. C. SWAN   2,336,199
CARBONATION TANK
Filed May 1, 1942   2 Sheets-Sheet 1
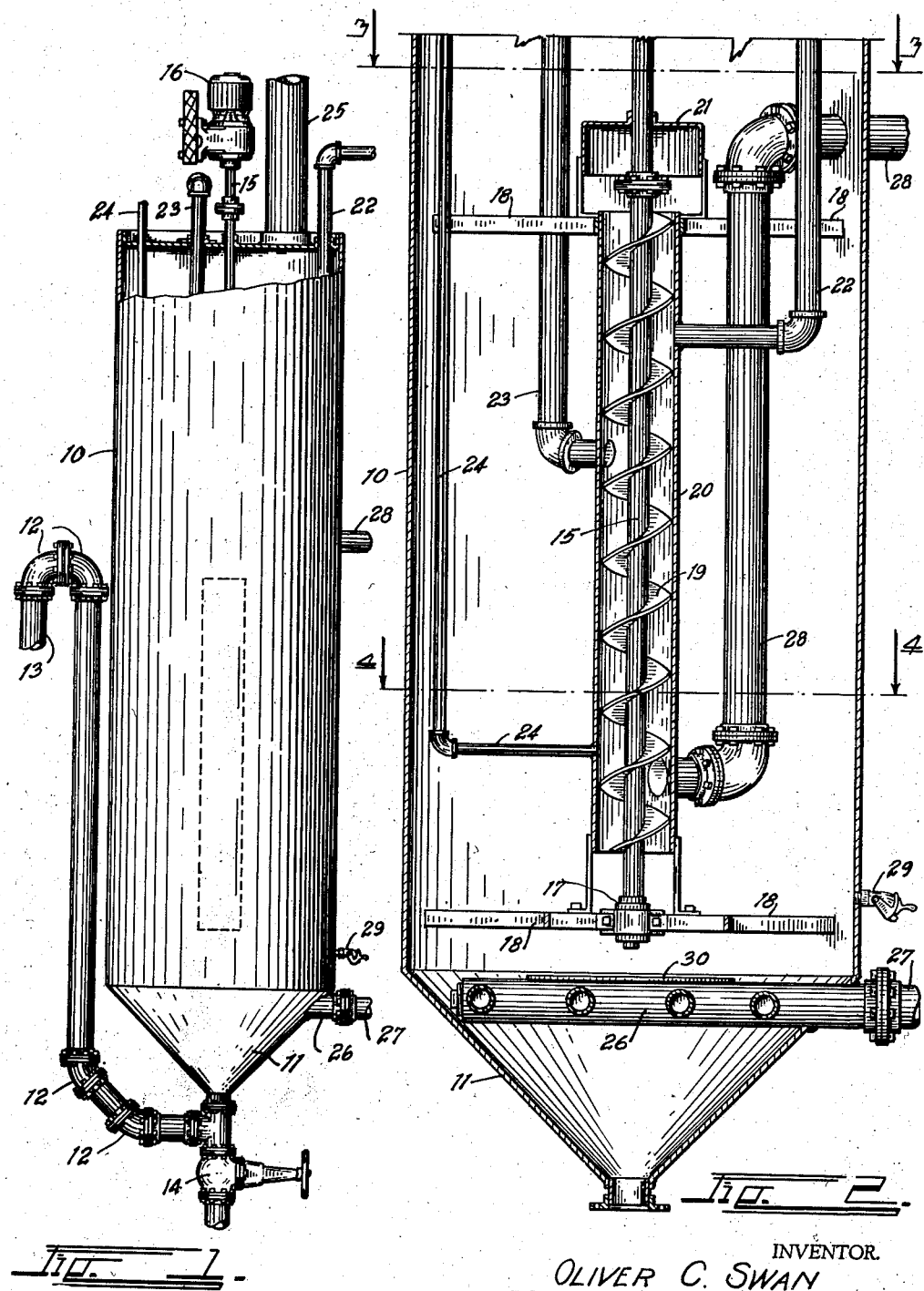
INVENTOR.
OLIVER C. SWAN
BY
ATTORNEY.

Dec. 7, 1943.  O. C. SWAN  2,336,199
CARBONATION TANK
Filed May 1, 1942  2 Sheets-Sheet 2
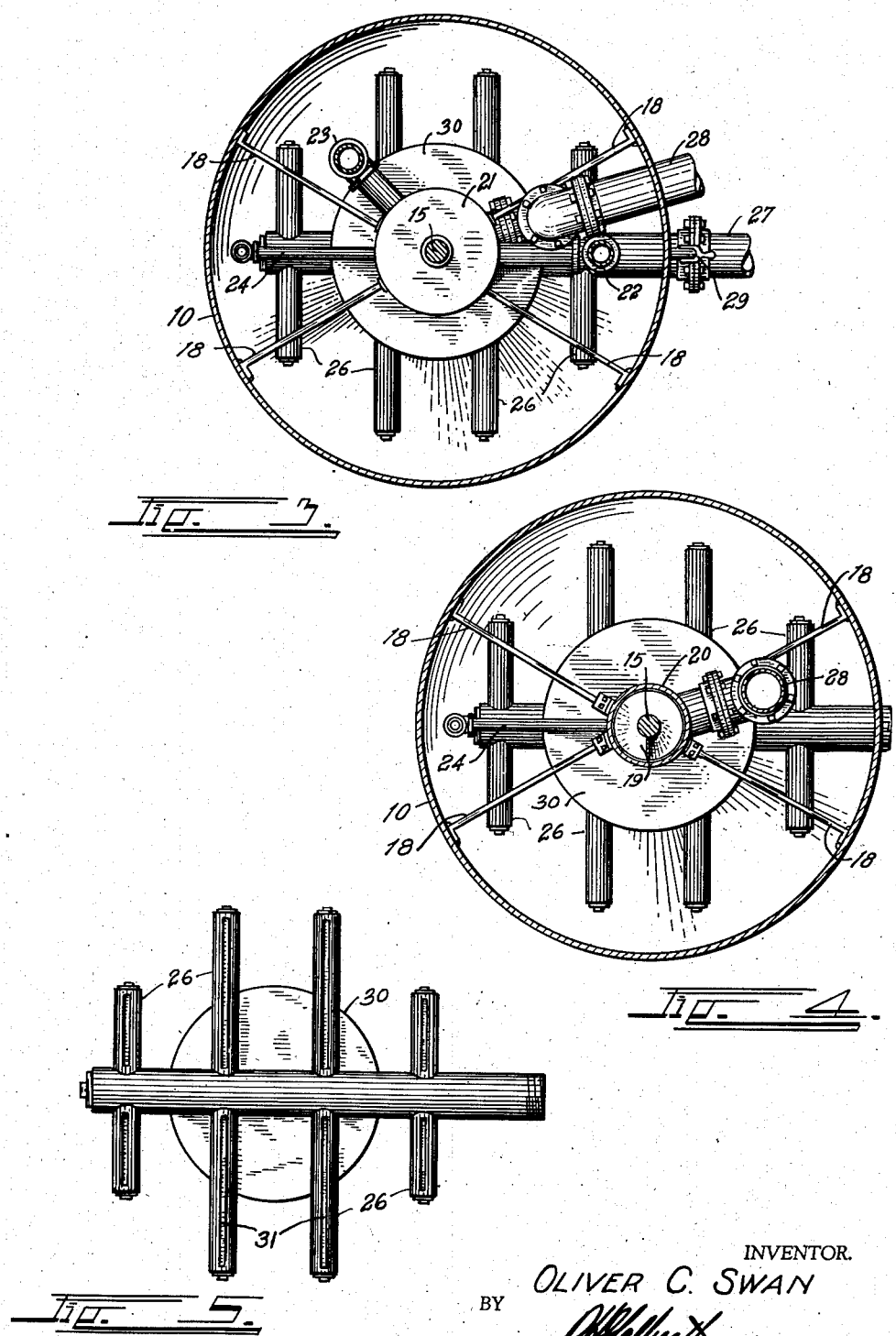
INVENTOR.
OLIVER C. SWAN
BY
ATTORNEY.

Patented Dec. 7, 1943

2,336,199

UNITED STATES PATENT OFFICE 2,336,199

CARBONATION TANK

Oliver C. Swan, Betteravia, Calif.

Application May 1, 1942, Serial No. 441,387

10 Claims. (Cl. 127—12)

This invention relates to a carbonation tank for use in sugar mills and has for its principal object the provision of a single, unitary tank with which both the liming and carbonation processes can be carried out continuously upon a continuous flow of saccharine juice to both clarify the juice and remove the clarifying reagent therefrom without interruption of the flow. Other objects are:

To provide a tank of this character in which the loss of juices by foaming or spraying will be eliminated; to provide an agitator for a tank of this character which will be continuously self cleaning and which will not subject the juice to harsh treatment which would break up the flocculant precipitate so as to interfere with settling and filtering; to provide heating means which will not become corroded or clogged; to provide means for quickly and efficiently cleaning the tank and equipment after use; and to provide an agitating mechanism which will not be dangerous to clean-up men if accidentally started during cleaning operations.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side view of the improved carbonation tank;

Fig. 2 is an enlarged vertical section through the lower portion of the tank;

Figs. 3, 4, and 5 are horizontal cross sections, taken on the lines 3—3, 4—4, and 5—5, respectively.

The entire mechanism is housed in a vertically elongated tank 10 having a conical bottom 11 discharging into an elbow fitting 12. An overflow line 13 leads from the elbow fitting 12 upwardly along the tank to the desired solution level therein thence turns downwardly to deliver the clarified outgoing juice to any desired point. A discharge valve 14 opens from the bottom of the elbow fitting 12.

An agitator shaft 15 extends axially downward through the top of the tank from a variable speed motor 16. The shaft 15 is mounted in suitable bearings 17 on cross members 18 in the tank. A spiral conveyor screw 19 surrounds the lower portion of the shaft.

The conveyor screw is surrounded by a relatively, closely fitting riser tube 20 which is open at both extremities. The tube is supported from the cross members 18 in any desired manner and extends the full length of the screw 19. An inverted, cup-shaped hood 21 is supported above the upper open extremity of the tube.

It is desired to call attention to the proportionate lengths of the tank and riser tube. It has been found that in usual field conditions a tank 30 feet high with a conveyor screw and rise tube approximately 10 feet long in its bottom produces the best results. This leaves ample space in the upper portion of the tank for frothing and foaming without loss.

The juice to be treated is fed directly into the lower portion of the riser tube 20 through a juice inlet 28. A steam pipe 22 extends downwardly through the top of the tank and enters the riser tube at a point about ⅓ of the length from the top of the tube. A milk-of-lime pipe 23 also extends downwardly from the top of the tank and enters the tube 20 approximately at its middle. A reagent pipe 24 extends downwardly in the tank and enters the riser tube near its bottom. A vapor stack 25 communicates through the closed top of the tank 10 to carry the vapors therefrom. A pipe grid 26 is placed in the bottom of the tank 10 immediately below the riser tube and is supplied with $CO_2$ gas from a $CO_2$ supply line 27. The pipes of the grid 26 are longitudinally slotted along their bottoms for the exit of the gas. A circular plate 30 covers the mid-portion of the grid 26 to divert the bubbles from entering the riser tube 20.

Operation

During operation the juice level in the tank is maintained at a point just below the top of the riser tube 20 by the preset overflow in the overflow pipe 13. Saccharine juice, milk-of-lime, steam and $CO_2$ gas are constantly flowing to the tank through their respective pipes, and the defecated juice is discharging from the tank through the overflow pipe 13.

The juice in the tank is drawn downwardly, by the suction created at the bottom of the riser tube 20 by the screw 19. Fresh juice also is entering the riser tube from the inlet 28. The juices are intermixed and elevated by the action of the screw. As the juices pass the outlet of the milk-of-lime pipe 23, they pick up the latter.

The milk-of-lime is intimately intermixed with the juice by the action of the screw. As the intermixed, limed juice passes the outlet of the steam pipe 22, its temperature is immediately raised to the boiling point so that it will boil from the top of the tube 20 against the hood 21 and into the upper portion of the tank. The quick use of the boiling temperature prevents the formation of bicarbonates and the resulting hard scale formations in the evaporators and pans.

The juice will then be drawn downwardly about the tube 20 by the action of the screw 19. In moving downwardly it must pass through the multitude of $CO_2$ bubbles rising in the juice from the pipe grid 26. The downward movement of the juice combined with the upward flow of the gas produces an intimate and complete contact between the lime and gas molecules to effect a complete removal of the lime therefrom as calcium carbonate. It will also be noted that the lime milk in endeavoring to drop by gravity in the riser tube encounters upwardly flowing juice. These conflicting flows, against both the lime and the gas, greatly increase the efficiency of mixture.

The calcium carbonate and the precipitant juice migrate to the bottom of the tank and from thence through the over flow pipe 13 to suitable settlers, filters or other treatment.

It is to be understood that the above refers to a selected sample of the juice. In actual operation, portions of the juice will return upward through the agitation tube for a second or third liming and flow downwardly through the tank for precipitation.

Tests are made through suitably positioned test cocks 29 to determine the condition of the juice and the valves of the various supply pipes are adjusted accordingly to obtain maximum results.

Should undue foaming occur, a suitable foam retardant can be introduced through the pipe 24 to counteract the difficulty. The foaming, however, is usually controlled by the action of the hood 21 which acts to throw the violently boiling juice directly downward into and onto the juices being carbonated to cool the former and to suppress the foam on the latter.

If necessary, the tank may be drained by opening the discharge valve 14. The tank may be then filled with water, the screw operated, and a suitable cleaning solvent introduced through the pipe 24 for cleaning out any accumulated deposits in the tank. The riser tube is continuously cleansed by action of the screw 19.

It will be noted that the incoming juice does not have an opportunity to dilute the limed or carbonated juices so as to interfere with the liming or carbonating reactions therein. The incoming juice enters the riser tube below the milk of lime pipe so that it receives its lime immediately and before it is intermixed with the tank juices. The liming and carbonation are therefore carried out in continuous successive steps on the continuously flowing juices.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A liming tank for sugar mills comprising: a vertically elongated tank; an open-ended, axially-positioned riser tube in the lower portion of said tank supported above the bottom thereof; means for introducing juice into said tube; mechanical means in said tube for impelling juice upwardly therein; means for introducing milk-of-lime into said riser tube in upwardly spaced relation to the juice inlet; and means for introducing live steam into said riser tube between the lime inlet and the upper end of the tube.

2. A carbonation tank for use in sugar mills comprising: a vertically elongated tank; an open-ended, axially-positioned riser tube in the lower portion of said tank supported above the bottom thereof; an overflow discharge leading from the lower end of said tank and positioned to maintain the fluid level therein substantially at the top of the riser tube; means for delivering juice into said tube near the lower end thereof; mechanical means in said tube for impelling juice upwardly therein and creating a downwardly flowing current in the juice surrounding said tube; means for introducing milk-of-lime into said tube in upwardly spaced relation to the juice inlet; means for heating the mixture of juice and lime as it approaches the upper end of the tube; and means adjacent the bottom of said tank for introducing $CO_2$ gas into the downwardly flowing juice.

3. A combined liming and carbonation tank comprising: a vertically elongated tank; an open-ended, axially-positioned riser tube in the lower portion of said tank supported above the bottom thereof; an overflow discharge leading from the bottom of said tank and positioned to maintain the fluid level therein substantially at the top of the riser tube; means for introducing juice into said tube near the lower end thereof; mechanical means in said tube for impelling juice upwardly therein and creating a downwardly flowing current in the juice surrounding said tube; means adjacent the bottom of said tank for introducing $CO_2$ gas into the downwardly flowing juice; and means for introducing milk-of-lime into said riser tube in upwardly spaced relation to the juice inlet.

4. A combined liming and carbonation tank comprising: a vertically elongated tank; an open-ended, axially-positioned riser tube extending vertically in the lower portion of said tank and supported above the bottom thereof; an overflow discharge leading from the lower end of said tank and positioned to maintain the fluid level therein substantially at the top of the riser tube; mechanical means in said tube for impelling juice upwardly therein and creating a downwardly flowing current in the juice surrounding said tube; means adjacent the bottom of said tank for introducing $CO_2$ gas into the downwardly flowing juice; means for introducing milk-of-lime into said riser tube in spaced relation to upper and lower ends thereof; a juice conduit entering said riser tube adjacent the bottom thereof and in downwardly spaced relation to the inlet for milk-of-lime for continuously supplying the juice to be treated thereto; and means for heating the mixture of juice and lime between the lime inlet and the upper end of the tube.

5. A combined liming and carbonation tank comprising: a vertically elongated tank; an open-ended, axially-positioned riser tube in the lower portion of said tank supported above the bottom thereof; an overflow discharge leading from the bottom of said tank and positioned to maintain the fluid level therein substantially at the top of the riser tube; means for introducing juice into the tube adjacent the lower end thereof, mechanical means in said tube for impelling juice upwardly therein and creating a downwardly flowing current in the juice surrounding said tube; means adjacent the bottom of said tank for introducing $CO_2$ gas into the downwardly flowing juice; means for introducing milk-of-lime into said riser tube spaced upwardly from the juice inlet; and a conduit entering said riser tube above the milk-of-lime inlet for supplying steam to the upper portion of the tube as a heating medium.

6. A combined liming and carbonation tank comprising: a vertically elongated tank; an open-ended, axially-positioned riser tube in the lower portion of said tank supported above the bottom thereof; an overflow discharge leading from the bottom of said tank and positioned to maintain the fluid level therein substantially at the top of the riser tube; mechanical means in said tube for impelling juice upwardly therein and creating a downwardly flowing current in the juice surrounding said tube; means adjacent the bottom of said tank for introducing $CO_2$ gas into the downwardly flowing juice; means for introducing juice into the tube adjacent the lower end thereof; means for introducing milk-of-lime into said riser tube at a point spaced upwardly from the juice inlet; means for heating the juice in the tube spaced upwardly from the lime inlet; an inverted, cup-shaped hood over said riser tube for directing the upwardly discharging juice downwardly in said tank.

7. A combined liming and carbonation tank comprising: a vertically elongated tank; an open-ended, axially-positioned riser tube in the lower portion of said tank supported above the bottom thereof; an overflow discharge leading from the bottom of said tank and positioned to maintain the fluid level therein substantially at the top of the riser tube; mechanical means in said tube for impelling juice upwardly therein and creating downwardly flowing current in the juice surrounding said tube; means adjacent the bottom of said tank for introducing $CO_2$ gas into the downwardly flowing juice; means for delivering steam as a heating medium into the tube adjacent the upper end thereof; means for introducing milk-of-lime into said riser tube spaced downwardly from the steam inlet; a juice conduit entering said riser tube adjacent the bottom thereof in downwardly spaced relation to the milk-of-lime inlet for continuously supplying the juice to be treated thereto; and an inverted, cup-shaped hood supported above said riser tube to direct the upwardly flowing juice downwardly in said tank about said tube.

8. A carbonation tank for use in sugar mills comprising: a vertically elongated tank; an open-ended, axially-positioned riser tube in the lower portion of said tank supported above the bottom thereof; an overflow discharge leading from the bottom of said tank and positioned to maintain the fluid level therein substantially at the top of the riser tube; mechanical means in said tube for impelling juice upwardly therein and creating a downwardly flowing current in the juice surrounding said tube; means for delivering juice to the tube near the lower end thereof; means for delivering milk-of-lime to the tube above the juice inlet, means between the lime inlet and the upper end of said tube for heating the juice; a pipe grid in the bottom of said tank having gas discharge orifices in its bottom; and means for supplying $CO_2$ gas to said grid.

9. A carbonation tank for use in sugar mills comprising: a vertically elongated tank; an open-ended, axially-positioned riser tube in the lower portion of said tank supported above the bottom thereof; an overflow discharge from the bottom of said tank positioned to maintain the fluid level therein substantially at the top of the riser tube; mechanical means in said tube for impelling juice upwardly therein and creating a downwardly flowing current in the juice surrounding said tube; an inlet pipe for juice communicating with said tube near the lower end thereof; an inlet pipe for milk-of-lime communicating with said tube and spaced upwardly from the juice inlet; means for heating the juice in the tube above the inlet for milk-of-lime; a pipe grid in the bottom of said tank below said tube having gas discharge orifices in its bottom; means for supplying $CO_2$ gas to said grid; and baffle means below said tube for deflecting the gas bubbles away from the lower end of said tube.

10. A combined liming and carbonation tank comprising: a vertically elongated tank; an open-ended, axially-positioned riser tube in the lower portion of said tank supported above the bottom thereof; an overflow discharge leading from the bottom of said tank and positioned to maintain the fluid level therein substantially at the top of the riser tube; a vertical screw conveyor in said tube for impelling juice upwardly therein and out of the top of the tube and creating a downwardly flowing current toward the lower end of the tube in the juice surrounding said tube; means adjacent the bottom of said tank for introducing $CO_2$ gas into the downwardly flowing juice; means for introducing milk-of-lime into said riser tube; a juice conduit entering said riser tube adjacent the bottom thereof at a point spaced downwardly from the milk-of-lime inlet for continuously supplying the juice to be treated into the tube; an inlet for heating steam communicating with said tube adjacent the top of the tube and spaced upwardly from the milk-of-lime inlet; a shaft extending upwardly from said conveyor through the top of said tank; and a motor mounted above said tank and being operatively connected with said shaft to rotate the latter.

OLIVER C. SWAN.